US012715087B2

(12) United States Patent
Sjöblom et al.

(10) Patent No.: US 12,715,087 B2
(45) Date of Patent: Aug. 25, 2026

(54) POWER TOOL COMPRISING A HYDRAULIC PULSE UNIT

(71) Applicant: ATLAS COPCO INDUSTRIAL TECHNIQUE AB, Stockholm (SE)

(72) Inventors: Torbjörn Sjöblom, Johanneshov (SE); Christian Friberg, Nacka (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 19/125,163

(22) PCT Filed: Oct. 10, 2023

(86) PCT No.: PCT/EP2023/078037
§ 371 (c)(1),
(2) Date: Apr. 28, 2025

(87) PCT Pub. No.: WO2024/104662
PCT Pub. Date: May 23, 2024

(65) Prior Publication Data

US 2026/0008159 A1 Jan. 8, 2026

(30) Foreign Application Priority Data

Nov. 17, 2022 (SE) .................................... 2230372-1

(51) Int. Cl.
*B25B 21/02* (2006.01)
*B25F 5/00* (2006.01)

(52) U.S. Cl.
CPC ............ *B25B 21/026* (2013.01); *B25F 5/005* (2013.01)

(58) Field of Classification Search
CPC ............................... B25B 21/026; B25F 5/005
See application file for complete search history.

(56) References Cited

U.S. PATENT DOCUMENTS 3,717,011 A 2/1973 Vana
4,785,693 A 11/1988 Minamiyama et al.
(Continued)

FOREIGN PATENT DOCUMENTS

EP 0070325 A1 1/1983
EP 0185639 A2 6/1986
(Continued)

OTHER PUBLICATIONS

Atlas Copco Industrial Technique AB, International Patent Application No. PCT/EP2023/078037, International Search Report, Jan. 26, 2024.
(Continued)

*Primary Examiner* — Michelle Lopez
(74) *Attorney, Agent, or Firm* — Moore & Van Allen PLLC; W. Kevin Ransom

(57) ABSTRACT

The present specification relates to an impulse tool comprising a hydraulic pulse unit arranged to intermittently transfer torque pulses to the tool output shaft, comprising an inertia drive member comprising a hydraulic fluid chamber, and being intermittently coupled to the output shaft via a hydraulic pressure pulse generating device dividing the hydraulic fluid chamber into a low and a high pressure chamber. A by-pass passage is provided to communicate fluid between the high pressure chamber and the low pressure chamber, wherein the hydraulic pressure pulse generating mechanism further comprises a first check valve arranged to allow a first flow from low pressure to high pressure side, and a second check valve arranged to allow a second flow from low pressure to high pressure side. The present specification also relates to a combined valve unit and bushing for use in a pulse unit of a pulse tool.

19 Claims, 3 Drawing Sheets

(56) References Cited

U.S. PATENT DOCUMENTS

| | | | |
|---|---|---|---|
| 5,092,410 A | 3/1992 | Wallace et al. | |
| 5,544,710 A | 8/1996 | Groshans et al. | |
| 6,110,045 A * | 8/2000 | Schoeps | B25B 21/02 173/93.5 |
| 6,599,197 B2 | 7/2003 | Tatsuno | |
| 2009/0008117 A1 | 1/2009 | Kettner | |

FOREIGN PATENT DOCUMENTS

| | | |
|---|---|---|
| EP | 0243334 A1 | 10/1987 |
| EP | 1048414 A1 | 11/2000 |

OTHER PUBLICATIONS

Atlas Copco Industrial Technique AB, International Patent Application No. PCT/EP2023/078037, Written Opinion, Jan. 26, 2024.

Atlas Copco Industrial Technique AB, Swedish Patent Application No. 2230372-1, Office Action, May 5, 2023.

* cited by examiner

POWER TOOL COMPRISING A HYDRAULIC PULSE UNIT

CROSS-REFERENCE TO RELATED APPLICATIONS

This application is a national stage application (filed under 35 § U.S.C. 371) of PCT/EP2023/078037, filed Oct. 10, 2023 of the same title, which, in turn claims priority to Swedish Patent Application No. 2230372-1, filed on Nov. 17, 2022; the contents of each of which are hereby incorporated by reference.

TECHNICAL FIELD

The present invention generally relates to power tools for tightening of threaded fasteners, more particularly to impulse type power tools having a hydraulic pulse unit.

TECHNICAL BACKGROUND

Electrical power tools for tightening are known to be used in various industries. For example, power wrenches of the impulse type comprising hydraulic pulse units are commonly used for continuous heavy production.

The hydraulic unit of such tools is filled with oil. In such pulse tools, torque pulses may be delivered to the output shaft by means of a pulse generating mechanism dividing a fluid chamber into a low pressure side and a high pressure side, where fluid may flow between the sides during operation.

Such flows of fluid are however often associated with losses, and hence have a large effect on the efficiency of the pulse tool.

In order to alleviate some of the problems solutions have been proposed comprising various designs and combinations of fluid paths and/or valves arranged to allow fluid flow between the low- and high pressure side. Known problems in pulse tool including designs of this type, however include increased complexity and low durability.

Hence, there exists a need for improvement in the field of power tools comprising hydraulic pulse units.

SUMMARY OF THE INVENTION

Accordingly, it would be desirable to provide a pulse tool where losses due to flow restrictions are kept low. In particular, it would be desirable to provide such an improved pulse tool in a less complex and more durable manner. To better address one or more of these concerns a pulse tool and a valve unit according to the independent claims are provided. Preferred embodiments are defined in the dependent claims.

According to a first aspect of the invention a pulse tool comprising a motor, an output shaft and a hydraulic pulse unit which is coupled to the motor, and arranged to intermittently transfer torque pulses to the output shaft is provided. The hydraulic pulse unit comprises an inertia drive member connected to the motor, wherein the drive member comprises a hydraulic fluid chamber, wherein an impulse receiving portion of the output shaft extends coaxially into the hydraulic fluid chamber, the impulse receiving output portion being intermittently coupled to the drive member via a hydraulic pressure pulse generating mechanism dividing the hydraulic fluid chamber into at least one low pressure chamber and at least one high pressure, wherein a by-pass passage is provided to communicate fluid between the high pressure chamber and the low pressure chamber, and wherein the hydraulic pressure pulse generating mechanism further comprises a first check valve arranged to allow a first flow from the low pressure to the high pressure side, and a second check valve arranged to allow a second flow from the low pressure to the high pressure side.

According to the first aspect, the impulse tool (or pulse tool, power wrench, power tool or tightening tool, these terms are used interchangeably throughout the present specification) provides an inventive solution to the concerns described above by means of a design incorporating fluid paths designed to ensure a desired flow between the low pressure side and the high pressure side.

More particularly, the design having two check valves allows for a larger flow from the low pressure side to the high pressure side thus reducing losses in the pulse unit. Hence the performance of the power tool may be significantly improved.

The referenced pulse tool may be an electrically driven pulse or a pneumatically driven pulse tool. The pulse tool may further comprise a housing having a front end and a back end, wherein the output shaft may be arranged at the front end of the housing. Further, the high- and low pressure chamber may also be referred to as a high- and low pressure compartment, high- and low pressure side or high- and low pressure section.

The first and second check valves may be arranged in a manner facilitating a sufficient flow from the low pressure side. The valves may for example in, in one embodiment, be arranged on opposite sides of the chamber—i.e. at an angular distance of 180 degrees.

In one embodiment, the impulse receiving portion may be formed in one piece with the output shaft and extend into the fluid chamber via a central opening in a front end wall of the inertia drive member. Further, the output member may comprise a transverse cylinder bore in which movably guided pistons are arranged. The pistons may be reciprocated in the cylinder bore by a cam comprising two cam lobes formed on the inner wall of the fluid chamber, acting on the pistons via e.g. rollers to drive hem inwardly thereby generating pressure peaks. A central cam spindle may be rotatively journalled in the output member to return the pistons and rollers to their outer position.

According to one embodiment, the bypass passage is provided separate from said first and second flow. For example, a bypass passage or leak flow may be provided at position separate from the first and second check valves. In some embodiment, the leak flow is provided through a separate component.

According to one embodiment, the bypass passage and at least a portion of one of said first and second check valve are formed in a single component. For example, the first and/or second valve may be valve units and the bypass passage may be formed in (or extend through) one of these units. Hereby a sufficient flow may be ensured in a particularly compact manner.

According to one embodiment, the single component comprises a body, wherein a center hole is provided in the body for allowing a flow of hydraulic fluid, wherein a valve body arranged to selectively close the center hole and wherein the bypass passage is provided to communicate fluid between the high pressure chamber and the low pressure chamber through the single component.

In one embodiment, the body has a cylindrical shape.

According to one embodiment, the at least one bypass passage extends axially through said body. For example, the bypass passage may extend along the axis of a cylindrical body.

In one embodiment, the flow through the bypass passage may flow substantially parallel to the flow through the check valve.

According to one embodiment, the said bypass passage is arranged radially outside the center hole. Radially referring to the radius of the center hole.

According to one embodiment, at least two bypass passages are arranged equally spaced along a circumference C1 of said center hole. By along should be understood along a portion of the body adjacent said circumference C1.

According to one embodiment, the at least one center hole forms part of a conical valve seat, and wherein said at least one bypass passage is arranged along a portion of said conical valve seat adjacent an outer circumference C2 of said conical valve seat. I.e., along a portion of the body lying adjacent said circumference C2.

According to one embodiment, the bypass passage is formed by at least one leak hole for allowing a leak flow through said single component. By leak hole should be understood a small hole allowing for a small flow from the high pressure side to the low pressure side during the pulse.

According to one embodiment, the single component is a combined bushing and valve unit having a cylindrical outer shape.

According to one embodiment, the body is a cylindrical bushing body having a center hole for allowing a flow of hydraulic fluid, wherein the at least one leak hole is a hole for allowing a leak flow through the bushing body forming the bypass passage. In one embodiment, the body may hence be described as a combined valve unit and leak hole bushing comprising a non-return valve assembly and one or more leak holes.

According to one embodiment, the component is removably arranged in said pulse unit. This is advantageous in that modularity may be achieved and in that service/exchange of units are facilitated.

Such a bushing may further comprise means for engaging a screw driver or similar to facilitate assembly and/or service and exchange. Such means may be adapted to engage any tool tip shape—e.g. torx, hex etc.

According to one embodiment, the bypass passage is provided in a separate element having a center hole for allowing a leak flow through said element, said center hole forming part of said bypass passage. The element may comprise a body, for example a cylindrical bushing body in which said center hole is formed. In one embodiment, this separate element has substantially the same dimensions as the first and second valve unit.

According to one embodiment, the first and second check valves are ball check valves comprising a respective ball and seat. The seat may be formed in a valve body, forming a valve unit along with said ball. The first and/or second check valve may be formed in a first and a second valve unit, which may be removably arranged in said pulse unit.

According to yet another aspect of the present invention a combined valve unit and bushing for a pulse tool comprising a body is provided, wherein a center hole is provided in the body for allowing a flow of hydraulic fluid, a ball arranged to selectively close the center hole/fluid flow; and at least one leak hole for allowing a leak flow through single component, thereby forming a bypass passage. Objectives, advantages and features of the valve unit conceivable within the scope of the second aspect of the invention are readily understood by the foregoing discussion referring to the first aspect of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be described in the following illustrative and non-limiting detailed description of exemplary embodiments, with reference to the appended drawing, on which

All figures are schematic, not necessarily to scale and generally only show parts which are necessary in order to elucidate the invention, wherein other parts may be omitted or merely suggested.

DETAILED DESCRIPTION

Figure 1:
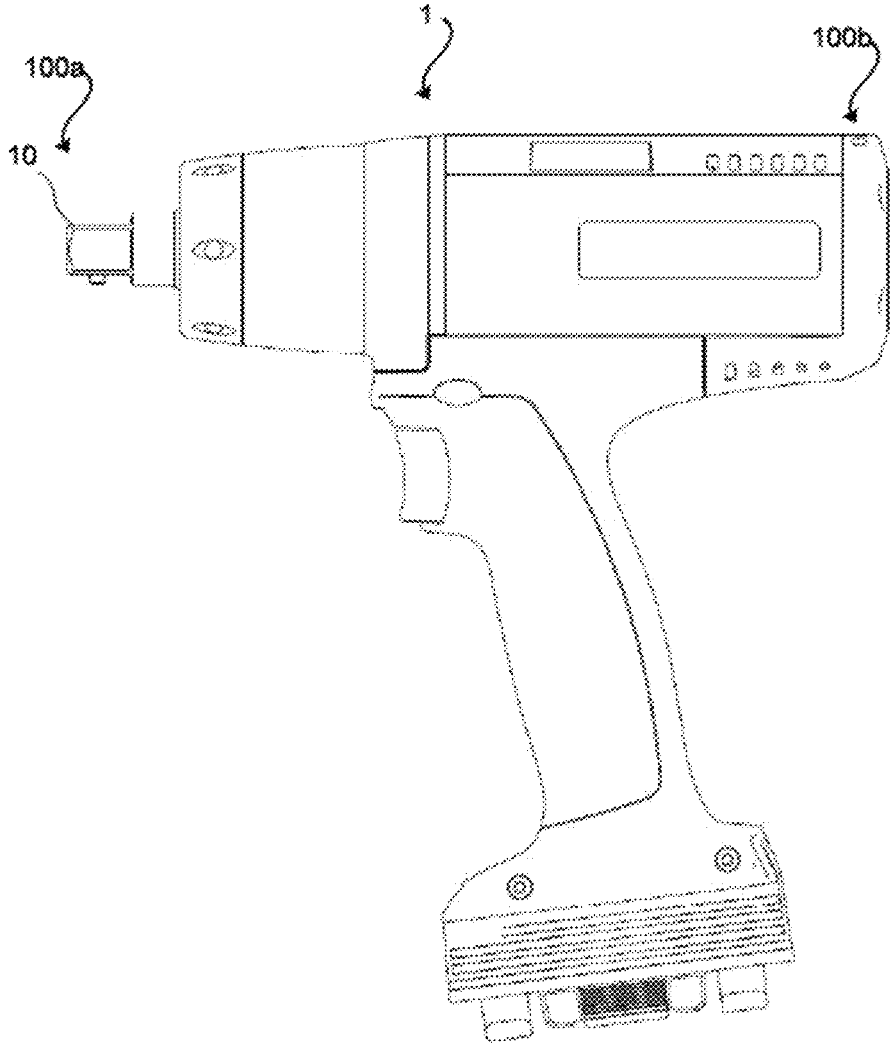
FIG. 1 is a perspective view of an exemplary pulse tool.

FIG. 1 shows an exemplary pulse tool 1 according to one embodiment, in this case a pistol type tool comprising a housing 100 having a front end 100*a* and a back end 100*b*, in which a motor and a hydraulic pulse unit is arranged, and further having a square ended output shaft 10 extending at the front end of the housing.

Figure 2A:
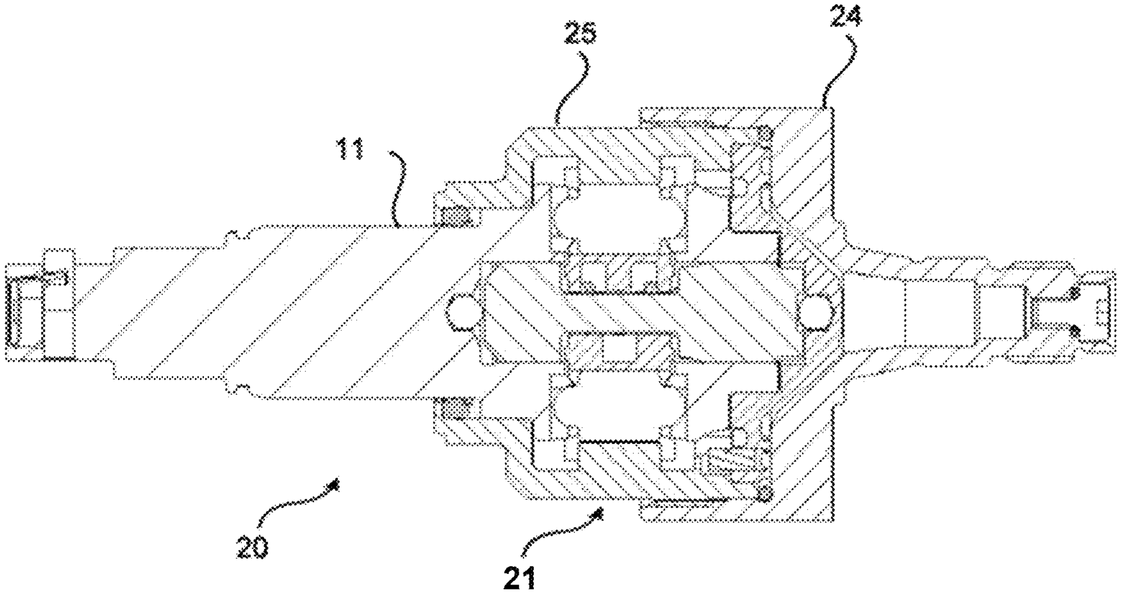
FIG. 2*a* is a cross sectional view of an exemplary pulse unit of a power tool according to one embodiment.

FIG. 2 shows an exemplary hydraulic pulse unit 20 according to one embodiment. The pulse unit, or impulse unit, is adapted to be coupled to the motor and arranged to intermittently transfer torque pulses to the output shaft.

The hydraulic pulse unit comprises an inertia drive member 21 including a cylindrical front piece 25 and an end piece 24. The rear part 24, or end piece 24, is formed with a coupling portion for connection to the motor connected to the motor. This inertia drive member in turn comprises a hydraulic fluid chamber 26 enclosed by the front- and end piece, in this case an oil chamber, into which an impulse receiving portion 11 of the output shaft extends. In the illustrated embodiment, the impulse receiving portion is formed in one piece with the output shaft 10 and extends into the fluid chamber via a central opening in a front end wall of the inertia drive member.

Figure 2B:
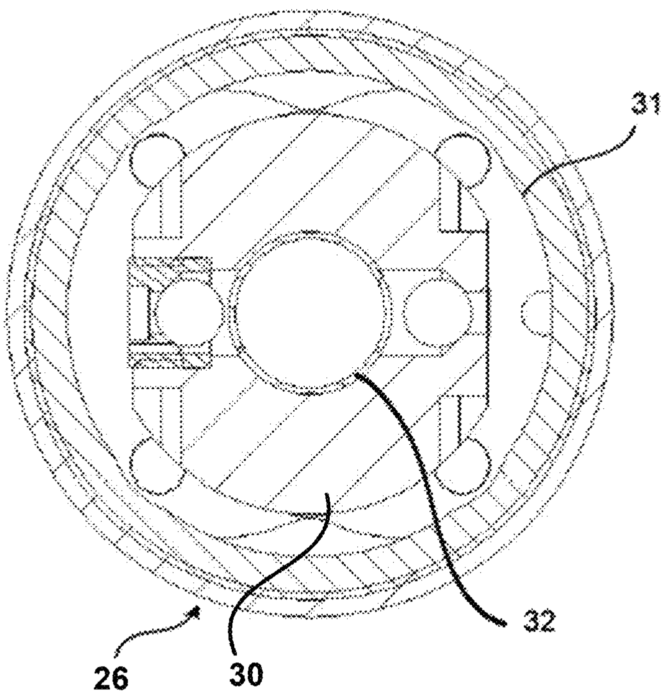
FIG. 2*b* is a transverse cross sectional view of an exemplary pulse unit of a power tool according to anther embodiment.

This impulse receiving output portion is during use intermittently coupled to the drive member via a hydraulic pressure pulse generating mechanism 30 dividing the hydraulic fluid chamber into at least one low pressure chamber 31 and at least one high pressure chamber 32 (indicated in the cross sectional view of FIG. 2*b*).

In order to achieve the pressure pulses, the output shaft in this embodiment comprises a transverse cylinder bore in which movably guided pistons are arranged. The pistons are reciprocated in the cylinder bore by a cam comprising two cam lobes formed on the inner wall of the fluid chamber, acting on the pistons via rollers to drive hem inwardly thereby generating pressure peaks. The operation of the impulse mechanism per se is however known in the art and will not be described in any further detail, similar mechanisms has been previously described for example in U.S. Pat. Nos. 6,110,045 and 13,697,107.

Figure 3A:
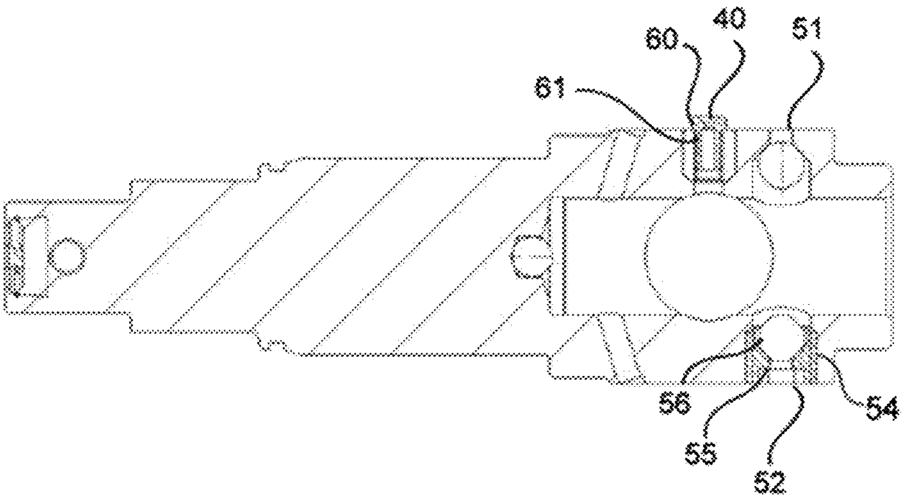
FIG. 3*a* is a cross sectional view of an exemplary pulse unit according to one embodiment.
Figure 3B:
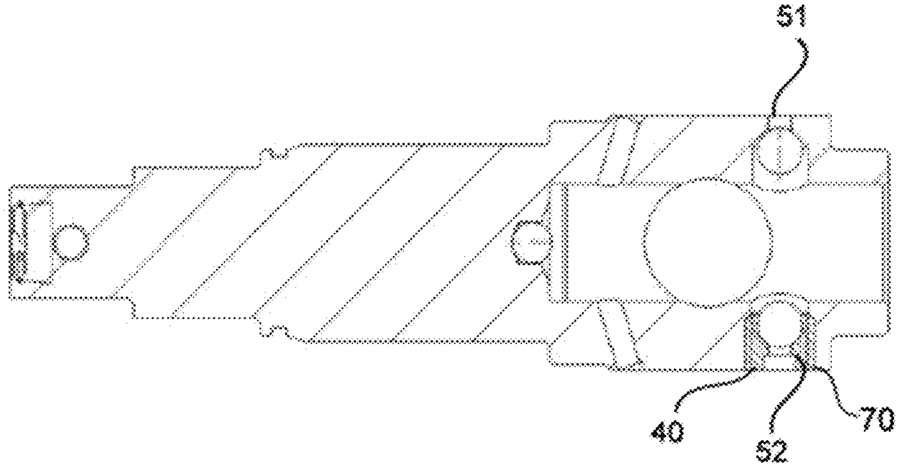
FIG. 3*b* is a cross sectional view of an exemplary pulse unit according to one embodiment.

In order to allow a fluid communication between the high pressure chamber and the low pressure chamber, several fluid flows are provided. Two exemplary embodiments showing these fluid flows are illustrated in FIGS. 3*a* and 3*b*. For example, a bypass passage 40 is provided allowing a flow between the chambers and the hydraulic pressure pulse generating mechanism further comprises a first check valve 51 arranged to allow a first flow from the low pressure to the high pressure side, and a second check valve 52 arranged to allow a second flow from the low pressure to the high pressure side. Both valves, or valve units, have a cylindrical outer shape and are removably arranged in the pulse unit.

During operation of the impulse unit the inertia drive member is rotated by the motor and a torque impulse is accomplished in the output shaft 10 and as described above, this is achieved by pistons reciprocated by a cam thereby causing a pressure increase. As the pressure increases, oil flows from the high pressure side to the low pressure side via the bypass passage(s) 40 described in the foregoing, hereby allowing for the pistons to move inwardly and hence for the cam to pass the rollers, in turn allowing for acceleration of the axle. To return the pistons and rollers to their outer position, a central cam spindle is rotatively journalled in the output member (not shown). As the central cam spindle rotates to return the pistons and rollers, oil is sucked back into the high pressure chamber again via the first and second check valves 51, 52 thus allowing for a high return-flow of oil.

In the embodiment shown in FIG. 3*a*, the bypass passage 40 is provided separate from said first and second flow via the first and second valve 51, 52. More particularly, the bypass passage 40 is provided in a separate cylindrical bushing body 60 having a center hole 61 for allowing a bypass or leak flow through the bushing body, and hence forming the bypass passage.

The first and second check valves 51, 52 are ball check valves each comprising respectively a valve body 54 in which a valve seat 55 interacting with a respective ball 56 is arranged. As may be seen from FIG. 3*a*, the separate cylindrical bushing body 60 in the illustrated embodiment has substantially the same dimensions as the first and second valve body 51, 52.

In FIG. 3*b*, another embodiment of the pulse unit is shown. In this embodiment, the bypass passage 40 and in this case the second check valve 52 are formed in a single component 70. In the illustrated embodiment in the form of a combined bushing and valve unit 70, or leak hole bushing unit 70, having a cylindrical outer shape and being removably arranged in the pulse unit.

Figure 4A:
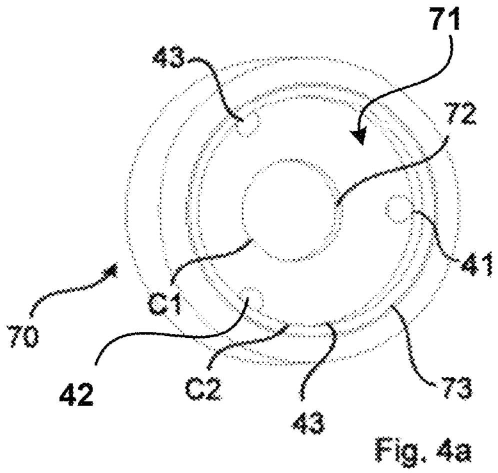
FIGS. 4*a* and 4*b* are different perspective views of a combined bushing and valve unit according to an exemplary embodiment.
Figure 4B:
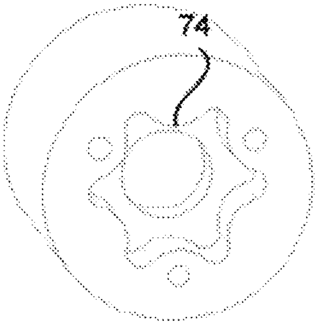

The bushing unit 70, shown in detail in FIGS. 4*a*-*b*, comprises a bushing body 71 having a center hole 72 for allowing a flow of hydraulic fluid and forming part of a conical valve seat 73 interacting with a ball. The bypass passage is in this case formed by three leak holes 41,42,43 arranged equally spaced along, or with respect to, a circumference C1 of said center hole, i.e. along a portion of said conical valve seat 73 adjacent an outer circumference C2 of said conical valve seat and hence radially outside the center hole 72.

Hence the fluid paths for the bypass flow, or leak flow, as well as for the first flow are both provided in the same bushing body 70 to communicate fluid between the high pressure chamber and the low pressure chamber through the single component.

FIG. 4*b* shows the means 74 for engaging a screw driver or similar provided in the bushing body, in this case adapted to engage a torx screwdriver.

Similarly to the embodiment disclosed above, the first check valve 51 is also a ball check valve comprising a ball and seat.

While the invention has been illustrated and described in detail in the drawings and foregoing description, such illustration and description are to be considered illustrative or exemplary and not restrictive; the invention is not limited to the disclosed embodiment. The skilled person understands that many modifications, variations and alterations are conceivable within the scope as defined in the appended claims. Additionally, variations to the disclosed embodiments can be understood and effected by those skilled in the art in practicing the claimed invention, form a study of the drawings, the disclosure and the appended claims. In the claims, the word “comprising” does not exclude other elements or steps and the indefinite article “a” or “an” does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A pulse tool comprising:

a motor;

an output shaft; and a hydraulic pulse unit which is coupled to said motor, and arranged to intermittently transfer torque pulses to said output shaft, wherein said hydraulic pulse unit comprises an inertia drive member connected to said motor, wherein said inertia drive member comprises a hydraulic fluid chamber, wherein an impulse receiving portion of said output shaft extends coaxially into said hydraulic fluid chamber, said impulse receiving portion being intermittently coupled to said drive member via a hydraulic pressure pulse generating mechanism dividing said hydraulic fluid chamber into at least one low pressure chamber and at least one high pressure chamber, wherein a by-pass passage is provided to communicate fluid between the high pressure chamber and the low pressure chamber, and wherein said hydraulic pressure pulse generating mechanism further comprises:

a first check valve arranged to allow a first flow of hydraulic fluid from said low pressure chamber to said high pressure chamber, and a second check valve arranged to allow a second flow of hydraulic fluid from said low pressure chamber to said high pressure chamber.

2. The pulse tool according to claim 1, wherein said bypass passage is provided separate from said first and second flow of hydraulic fluid.

3. The pulse tool according to claim 2, wherein said bypass passage is provided in a separate element having a center hole for allowing a leak flow of hydraulic fluid through said element, said center hole forming part of said bypass passage.

4. The pulse tool according to claim 1, wherein said bypass passage and at least a portion of one of said first and second check valves are formed in a single component.

5. The pulse tool according to claim 4, wherein said bypass passage is formed by at least one leak hole for allowing a leak flow of hydraulic fluid through said single component.

6. The pulse tool according to claim 5, wherein said single component is a combined bushing and valve unit having a cylindrical outer shape, wherein said body is a cylindrical bushing body having a center hole for allowing a flow of hydraulic fluid, and wherein said at least one leak hole is a hole for allowing a leak flow of hydraulic fluid through said bushing body forming said bypass passage.

7. The pulse tool according to claim 4, wherein said single component is a combined bushing and valve unit having a cylindrical outer shape.

8. The pulse tool according to claim 4, wherein said single component is removably arranged in said pulse unit.

9. The pulse tool according to claim 4, wherein said single component comprises a body, wherein a center hole is provided in said body for allowing a flow of hydraulic fluid, wherein a valve body arranged to selectively close said center hole and wherein said bypass passage is provided to communicate fluid between the high pressure chamber and the low pressure chamber through said single component.

10. The pulse tool according to claim 9, wherein said bypass passage extends axially through said body.

11. The pulse tool according to claim 10, wherein said bypass passage is arranged radially outside said center hole.

12. The pulse tool according to claim 10, comprising at least two bypass passages arranged equally spaced along a circumference of said center hole.

13. The pulse tool according to claim 10, wherein said at least one center hole forms part of a conical valve seat, and wherein said at least one bypass passage is arranged along a portion of said conical valve seat adjacent an outer circumference of said conical valve seat.

14. The pulse tool according to claim 9, wherein said bypass passage is arranged radially outside said center hole.

15. The pulse tool according to claim 14, wherein said bypass passage is arranged radially outside said center hole.

16. The pulse tool according to claim 14, comprising at least two bypass passages arranged equally spaced along a circumference of said center hole.

17. The pulse tool according to claim 9, comprising at least two bypass passages arranged equally spaced along a circumference of said center hole.

18. The pulse tool according to claim 9, wherein said center hole forms part of a conical valve seat, and wherein said at least one bypass passage is arranged along a portion of said conical valve seat adjacent an outer circumference of said conical valve seat.

19. The pulse tool according to claim 1, wherein said first and second check valves are ball check valves comprising a respective ball and seat.

* * * * *